United States Patent [19]

Kopp et al.

[11] 4,377,644

[45] Mar. 22, 1983

[54] MIXED ANHYDRIDES OF ISOCYANATES AND CARBOXYLIC ACIDS, MIXTURES THEREOF WITH CARBOXYLIC ACIDS, AND THE USE THEREOF AS BLOWING AGENTS FOR THE PRODUCTION OF CELLULAR PLASTICS

[75] Inventors: Richard Kopp, Cologne; Gerhard Grögler, Leverkusen, both of Fed. Rep. of Germany; Max Mann, Forest Green, Pa.

[73] Assignee: Bayer Aktiengesellschaft, Leverkusen, Fed. Rep. of Germany

[21] Appl. No.: 312,034

[22] Filed: Oct. 16, 1981

[30] Foreign Application Priority Data

Nov. 4, 1980 [DE] Fed. Rep. of Germany ....... 3041589

[51] Int. Cl.$^3$ ............................................. C08G 18/14
[52] U.S. Cl. ..................................... 521/94; 521/128
[58] Field of Search ................................ 521/94, 128

[56] References Cited

U.S. PATENT DOCUMENTS

| | | | |
|---|---|---|---|
| 2,360,210 | 10/1944 | Dickey et al. ...................... | 260/546 |
| 2,572,568 | 10/1951 | Gluesenkamp ...................... | 521/94 |
| 2,963,510 | 12/1960 | Scott et al. ......................... | 521/128 |
| 3,725,321 | 4/1973 | Wirth et al. ....................... | 260/2.5 R |
| 3,728,292 | 4/1973 | McGrath et al. .................... | 521/94 |
| 4,070,310 | 1/1978 | Schneider et al. .................. | 521/129 |
| 4,221,686 | 9/1980 | Sakiyama et al. .............. | 260/23 EP |

FOREIGN PATENT DOCUMENTS 2218328 10/1973 Fed. Rep. of Germany .
969114 9/1964 United Kingdom .

OTHER PUBLICATIONS

Dr. Otto Bayer, Angewandte Chemie 59, 267 (1947).
Methoden der Organischen Chemie, Houben-Weyl, p. 143, vol. XIV/2.
Annalen der Chemie, Justus Liebigs, vol. 561, 1949, S. Peterson, p. 205-229 "Niedermoleculare Umsetzungsprodukte aliphatisches Diisocyanate" 210.
R. Vieweg et al., Kunststoffe-Handbuch, vol. 7, "Polyurethane", p. 25.

*Primary Examiner*—Maurice J. Welsh
*Attorney, Agent, or Firm*—Gene Harsh; Joseph C. Gil; Richard A. Elder

[57] ABSTRACT

This invention relates to solid reaction products of aliphatic, cycloaliphatic or araliphatic mono- and/or polyisocyanates and organic, weakly acid mono- and/or polycarboxylic acids for the production of cellular plastics articles and particularly polyurethane foams. The products of the present invention may also be in the form of mixtures with carboxylic acids. The products are suitable for the production of cellular or porous plastics articles, but are preferably used in the preparation of cellular thermoplastic polyurethanes and semi-rigid and particularly rigid polyurethane integral skin foams having a compact outer skin formed by foaming the reaction mixture in closed molds.

15 Claims, No Drawings

MIXED ANHYDRIDES OF ISOCYANATES AND CARBOXYLIC ACIDS, MIXTURES THEREOF WITH CARBOXYLIC ACIDS, AND THE USE THEREOF AS BLOWING AGENTS FOR THE PRODUCTION OF CELLULAR PLASTICS

BACKGROUND OF THE INVENTION

The production of shaped polyurethane foam articles having a compact surface by foaming in molds is known (see, for example German Auslegeschrift No. 1,196,864). A reactive and foamable mixture based on compounds containing isocyanate-reactive hydrogen atoms and polyisocyanates is introduced into a mold. In conventional processes, water and/or fluorochlorinated hydrocarbons are used as blowing agents. Catalysts of the type known in the production of polyurethane foams are also generally used.

By suitably selecting the starting components and, in particular, by suitably selecting the molecular weight and the functionality of the various components, it is possible to produce foams ranging from elastic to rigid. In this process, the compact outer skin is obtained by introducing into the mold a larger quantity of foamable mixture than is required to fill the mold by free foaming. The inner wall of the mold generally cools the reaction mixture over its inner surface and causes condensation of the preferred organic blowing agents. The blowing reaction comes to a stop at the inner wall of the mold and a compact outer skin is formed.

The organic blowing agents used for this process are halogenated hydrocarbons since they have a low boiling point and do not form explosive mixtures with air. Pentane, for example, is difficult to use as a blowing agent because elaborate safety precautions would have to be taken due to the low explosion limit.

Proven blowing agents for polyurethane foams include fluorotrichloromethane and/or methylene chloride. Efforts are being made to replace these blowing agents by blowing agents free from fluorinated hydrocarbons for reasons of pollution control, however. Accordingly, it has become desirable to develop alternative blowing agents for the production of cellular and porous plastics articles.

As already mentioned, water is often used as a blowing agent in the production of polyurethanes. Although it is possible by using water to produce polyurethane free-rise foams of outstanding quality, water is not suitable for the production of integral skin foams because both the surface and the integral structure of the foam are decidedly inferior when compared with integral skin moldings foamed with fluorinated hydrocarbons. The carbon dioxide given off when water is used as the blowing agent does not condense on the cool inner wall of the mold. Because of this, there is no formation of the desired compact outer skin. Further, in the reaction between isocyanate and water, amino groups are formed from the isocyanate groups and immediately react with the excess isocyanate groups, increasing the viscosity of the reaction mixture.

Water is generally added to the reaction mixture as an individual component immediately before foaming. When water is added to the polyol component which normally already contains the tin compounds (such as dibutyl tin (IV) dilaurate) essential as foaming catalysts, the tin compounds can undergo at least partial hydrolysis, resulting in an uncontrolled reduction in the activity of the completed polyol component.

Other alternative blowing agents are compounds which decompose at temperatures above room temperature and, in doing so, give off a blowing gas. Examples of these compounds include azodicarbonamide, azobisisobutyronitrile or diphenylene oxide disulfohydrazide which give off nitrogen under the effect of heat. Compounds which give off carbon dioxide include pyrocarbonic acid esters and anhydrides (German Offenlegungsschrift No. 2,524,834/U.S. Pat. No. 4,070,310) and benzo-oxazines (German Auslegeschrift No. 2,218,328).

These compounds must have a relatively low decomposition temperature which should generally be below 100° C. since the blowing agents must be active at the beginning of the urethanization reaction when the heat of reaction is still at a relatively low level. However, compounds having such a low decomposition temperature are naturally sensitive during storage and require careful handling which in many cases cannot be guaranteed during the processing of polyurethane foams by fabricators. In addition, these compounds may undergo uncontrolled decomposition during storage.

It is also generally known that carboxyl groups react with isocyanates to give off $CO_2$ and thus are capable of contributing to the blowing reaction in polyurethane plastics (O. Bayer, Angewandte Chemie, 59, 267 (1947)). However, this reaction is extremely involved (particularly for aromatic isocyanates of the type used commercially), leads to discoloration in polyurethane, and is generally not adequate for blowing reactions on a commercial scale.

In order to ensure effective synthesis of the polyurethane in the polymer-forming reaction, it is therefore normally necessary to use urethane compounds which contain only terminal OH-groups. In the case of polyester polyols, they may also contain a few terminal carboxyl groups (acid numbers in the usual range from about 0.1 to 2). However, these small numbers of terminal carboxyl groups are of very minor significance to the blowing reaction. Polyester polyols of this type are preferably used in the production of non-cellular polyurethane elastomers. If polyesters containing predominant amounts of terminal carboxyl groups are used, the generation of $CO_2$ is still inadequate. Additionally, synthesis of the polymer follows a different course and gives product properties differing from polyurethanes.

DESCRIPTION OF THE INVENTION

It has now surprisingly been found that mixed anhydrides which are obtained by the reaction of weak organic mono- and/or polycarboxylic acids with mono- and/or polyisocyanates bound to aliphatic, cycloaliphatic, or araliphatic radicals, begin to give off $CO_2$ in some cases at temperatures as low as about 50° C. The reaction products are stable in storage both in the pure form and in certain solvents (for example, in the polyol component of the polyurethanes). Furthermore, they do not undergo any uncontrolled reaction in the event of mechanical stressing (impact) or when heated in the presence of catalysts of the type normally used in polyurethane chemistry.

The compounds of the present invention correspond to the general formula

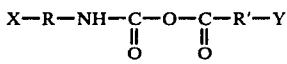

in which
R is a monofunctional or polyfunctional (preferably up to tetrafunctional; mostly preferred mono- and difunctional) saturated or unsaturated aliphatic, cycloaliphatic or araliphatic radical, any of which may optionally be substituted by further substituents (preferably alkyl, aryl or halogen), which are not reactive to isocyanates;

R' is a monofunctional or polyfunctional (preferably up to tetrafunctional, most preferred mono and difunctional) aliphatic, cycloaliphatic, araliphatic or aromatic radical (optionally containing groups which are not reactive to NCO from the alkyl or halogen series);

X represents H or

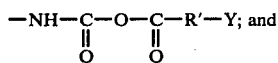

Y represents H or

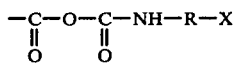

When R, respectively R', is monofunctional, then X, respectively Y, will mean hydrogen.

When R is n-functional, then X will mean (n−1)-times the radical

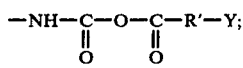

when R' is n-functional, then Y will mean (n−1)-times the radical

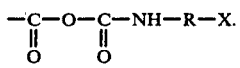

It is preferred, that X is hydrogen or one times the radical

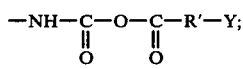

for Y is preferred hydrogen or one-times the radical

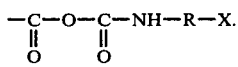

Several compounds of this type have already been described in the literature (see, for example, S. Petersen, Liebigs Ann. Chem. 562, 205 (1949); Y. Iwakura and K. Yoneshima, Z. Chem. Soc. Jap., Pure Chem. Sect. 70, 151 to 153 (1949). The compounds may be produced by initially introducing one of the reactants into an NCO-inert organic solvent, preferably unpolar or slightly polar solvents such as hydrocarbons, ethers, ketones or esters (for example, petroleum ether) and adding the other reactant, optionally dissolved in the same solvent, dropwise with gentle cooling (10° to 20° C.). A slight excess of carboxylic acid (up to about 30% by weight) is preferably used. The produced formed as solids are filtered off under suction, washed with a suitable, preferably low-boiling ($\leq 100°$ C. solvent, such as petroleum ether, and dried in air until constant in weight.

Only those compounds which are formed as solids (melting point above 40° C.) are technically suitable for use as blowing agents in accordance with this invention because it is only these compounds which show adequate stability in storage.

The decomposition reaction of the mixed anhydrides of the present invention essentially yields amide linkages in addition to gaseous $CO_2$, according to the following:

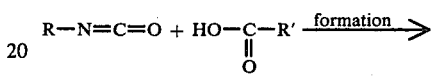

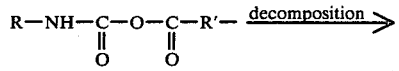

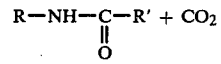

Isocyanates suitable for use in the production of the mixed anhydrides include saturated or unsaturated aliphatic, cycloaliphatic and araliphatic mono- and/or polyisocyanates (preferred mono- to tetra-isocyanates, mostly preferred mono- and diisocyanates) which contain the NCO-group bound to aliphatic or cycloaliphatic radicals. Preferred isocyanates include, isocyanato-n-butane, isocyanato-n-hexane, 1-isocyanato-hexadecane, isocyanato-cyclohexane, 1,4-diisocyanato-n-butane, 1,6-diisocyanato-n-hexane, 1,8-diisocyanato-n-octane, 1-isocyanato-3-isocyanato-methyl-(3,5,5-trimethyl)-cyclohexane, caproic acid methyl ester-2,6-diisocyanate, 2,4- and/or 2,6-diisocyanato-1-methyl cyclohexane, 4,4'- and/or 2,4'-diisocyanato-bicyclohexyl methane, 4-phenyl cyclohexyl isocyanate, 4-(p-methyl phenyl)-cyclohexyl isocyanate, 1,4-diisocyanato-cyclohexane, 4-(3'-chlorophenyl)-cyclohexyl isocyanate, and trimerized, biuretized or allophanatized aliphatic diisocyanates.

Carboxylic acids suitable for use in the production of the mixed anhydrides according to the invention are weak (weaker than formic or oxalic acids) aliphatic, cycloaliphatic, araliphatic, aromatic or heterocyclic carboxylic acids. Examples include acetic acid, propionic acid, butyric acid, caproic acid, pivalic acid, octanoic acid, dodecanoic acid, coconut oil fatty acid mixtures, succinic acid, adipic acid alkyl semiester, acrylic acid, methacrylic acid, cyclohexane carboxylic acid, 4,4'-dicyclohexyl methane dicarboxylic acid, phenyl acetic acid, benzoic acid, meta- or para-toluylic acid.

Theoretically, formic acid ($PK_1 = 3.76$) and oxalic acid ($PK_1 = 1.23$) would be the compounds which would give mixed anhydrides with the highest yield of $CO_2$ by weight. However, it has been found that their mixed anhydrides are unstable, as are the mixed anhydrides produced from aromatic polyisocyanates and carboxylic acids.

Accordingly, mixed anhydrides formed from weak carboxylic acids (having a PK-value of about 4 to 7, and preferably of 4.5 to 6.5) and mono- and/or polyisocyanates bound to aliphatic or cycloaliphatic residues are preferable.

Accordingly, the present invention is directed to anhydrides having melting points of at least 40° C. which are formed by reacting mono- and/or polyisocyanates bound to aliphatic or cycloaliphatic radicals and weak organic mono- and/or polycarboxylic acids having $PK_1$- values of from 4 to 7, and the use thereof as blowing agents for the production of cellular or foamed plastic products. The blowing agents are employed in quantities of from 0.05 to 20% by weight. The blowing reaction is preferably carried out at temperatures above 100° C.

The present invention also relates to new mixed anhydrides corresponding to the formula

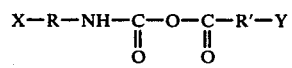

wherein
R represents a monofunctional or polyfunctional (preferably mono- or difunctional) aliphatic radical, a cycloaliphatic radical or an araliphatic radical, which may contain alkyl- or halogen substituents in the cyclohexane or aromatic nucleus;
R' represents a monofunctional or polyfunctional (preferably monofunctional or difunctional) aliphatic radical containing four or more carbon atoms, a cycloaliphatic radical, araliphatic or aromatic radicals with seven or more carbon atoms (optionally containing substituents which are not reactive to NCO from the alkyl or halogen series);
X represents H or

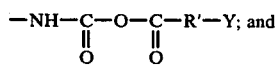

Y represents H or

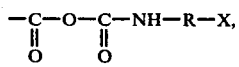

and Y as given above.

More preferably, the present invention relates to mixed anhydrides of the formula

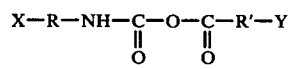

wherein
R represents an aliphatic radical containing up to sixteen carbon atoms, a cyclohexane radical, a tetramethylene radical or a hexamethylene radical;
R' represents a pivalyl radical or a $C_4$-$C_{18}$-alkyl radical, a toluyl radical or a tetramethylene radical;
X represents H or one times the radical

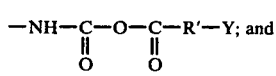

Y represents H or one times the radical

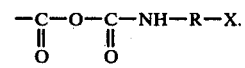

Some of the mixed anhydrides produced herein are shown with their melting and decomposition points in the following Table:

TABLE

| Isocyanate Component | Carboxylic acid Component | Melting Point | Beginning of decomposition |
|---|---|---|---|
| Isocyanatocyclohexane | adipic acid | 115–118° C. | 136° C. |
| Isocyanatohexadecane | acetic acid | 58–60° C. | 80° C. |
| Isocyanatohexadecane | adipic acid | 73–76° C. | 136° C. |
| Isocyanatohexadecane | benzoic acid | 102–104° C. | 118° C. |
| 1,4-diisocyanatobutane | acetic acid | 63–65° C. | 65° C. |
| 1,4-diisocyanatobutane | propionic acid | 53–55° C. | 80° C. |
| 1,4-diisocyanatobutane | pivalic acid | 86–88° C. | 95° C. |
| 1,4-diisocyanatobutane | benzoic acid | 92–94° C. | 103° C. |
| 1,4-diisocyanatobutane | acrylic acid | 54° C. | 54° C. |
| 1,6-diisocyanatohexane | acetic acid | 63–65° C. | 63° C. |
| 1,6-diisocyanatohexane | propionic acid | 66° C. | 66° C. |
| 1,6-diisocyanatohexane | pivalic acid | 85° C. | 87° C. |
| 1,6-diisocyanatohexane | dodecanoic acid | 75–80° C. | 120° C. |
| 1,6-diisocyanatohexane | coconut oil fatty acid mixture | 71° C. | 71° C. |
| 1,6-diisocyanatohexane | acrylic acid | 50–56° C. | 50.5° C. |
| 1,6-diisocyanatohexane | adipic acid | 110° C. | 110° C. |
| 1,8-diisocyanatooctane | acetic acid | 84–87° C. | 96° C. |
| 1,8-diisocyanatooctane | acrylic acid | 58–59° C. | 59° C. |

Mixed anhydrides which begin to decompose above 50° C. and preferably above 62° C. are particularly suitable for use on a commercial scale.

As blowing agents, these compounds are used in quantities of from 0.05 to 30% by weight, preferably in quantities of from 1 to 12% by weight and, most preferably in quantities of from 3 to 10% by weight, based on the total quantity of polymer starting materials and blowing agents. They may be added to the polymer-forming starting materials or to thermoplastic materials to be formed, preferably at temperatures below the decomposition temperature of these materials. They may also be used in combination with known blowing agents.

In the processing of thermoplastic materials such as polystyrene, the blowing agent is mixed in with the material to be foamed using, for example, mixing rolls, internal mixers, stirrer-equipped mixing vessels, or even by scattering the agent in powder form onto the thermoplastic material.

In one preferred embodiment for the production of integral skin polyurethane foams, the blowing agent is dispersed or dissolved in the polyol mixture and the resulting dispersion or solution is reacted with the polyisocyanate.

Suitable polyol starting components for cellular polyurethanes are normally compounds containing at least two-isocyanate-reactive hydrogen atoms and generally having molecular weights of from 62 to 10,000. Compounds containing hydroxyl groups (particularly compounds containing from 2 to 8 hydroxyl groups and having relatively high molecular weights (especially those having molecular weights in the range from 400 to 8000 and preferably from 600 to 4000) are preferably used.

Examples of such compounds include polyesters, polyethers, polythioethers, polyacetals, polycarbonates and polyesteramides containing at least 2 (generally 2 to 8, but preferably 2 to 4) hydroxyl groups and of the types generally known for the production of non-cellular or cellular polyurethanes, or mixtures thereof.

These polyol starting components may be mixed with other low molecular weight polyfunctional compounds, such as preferably other polyols and even polyamines or polyhydrazides having molecular weights of from about 62 to 400, in order to modify the properties of the polyurethanes. However, the polyol mixture should contain predominant amounts (for example more than 60% by weight and preferably more than 80% by weight) of the relatively high molecular weight polyols having molecular weights of from 400 to 10,000 and preferably from 600 to 4000. The average molecular weight of the polyol mixture should be between 400 and 10,000 (preferably between 600 and 4000) if cellular polyurethane elastomers and polyurethane foams are to be produced.

The preferred polyethers contain at least 2 (generally 2 to 8 and preferably 2 or 3) hydroxyl groups and are generally known. They may be obtained by polymerizing epoxides, such as ethylene oxide, propylene oxide, butylene oxide, tetrahydrofuran, styrene oxide or epichlorohydrin. These epoxides may be polymerized on their own, for example in the presence of Friedel-Crafts catalysts, such as boron trifluoride, or by adding these epoxides (preferably ethylene oxide and propylene oxide in ratios, for example, of from 5:95 to 95:5), in admixture or successively, with starter components containing reactive hydrogen atoms, such as water, alcohols, ammonia or amines. Examples of starter components include ethylene glycol, propylene glycol, 1,3- or 1,2-propylene glycol, trimethylol propane, glycerol, sorbitol, 4,4'-dihydroxy diphenyl propane, aniline, ethanolamine or ethylene diamine. Sucrose polyesters and formitol or formose-started polyethers may also be used. In many cases, it is preferred to use polyethers containing predominantly (up to 90%, by weight, based on all the OH-groups present in the polyether) primary OH-groups. Polybutadienes containing OH-groups are also suitable.

Examples of suitable polyesters containing hydroxyl groups are reaction products of polyhydric (preferably dihydric and, optionally, trihydric) alcohols with polybasic, (preferably dibasic) carboxylic acids. The polycarboxylic acids may be aliphatic, cycloaliphatic, aromatic and/or heterocyclic and may be unsaturated and/or substituted, for example, by halogen atoms. Specific examples of these carboxylic acids and their derivatives include adipic acid; sebacic acid; isophthalic acid; trimellitic acid; phthalic acid anhydride; hexahydrophthalic acid anhydride; tetrachlorophthalic acid anhydride; endomethylene tetrahydrophthalic acid anhydride; fumaric acid; dimerized or trimerized unsaturated fatty acids, optionally in admixture with monomeric unsaturated fatty acids; terephthalic acid dimethyl ester and terephthalic acid-bis-glycol ester. Examples of suitable polyhydric alcohols include ethylene glycol, propylene glycol, trimethylene glycol, tetramethylene glycol, 2,3-butylene glycol, hexamethylene diol, octamethylene diol, neopentyl glycol, 1,4-bis-hydroxymethyl cyclohexane, 2-methyl-1,3-propane diol, glycerol, trimethylol propane, 1,2,6-hexane triol, trimethylol ethane, pentaerythritol, sorbitol, formitol, methyl glycoside, diethylene glycol, triethylene glycol, tetraethylene glycol and higher polyethylene glycols, dipropylene glycol, higher propylene glycols, dibutylene glycol and higher polybutylene glycols. The polyesters may contain some terminal carboxyl groups, in general less than 5 mols % of all endgroups. Polyesters of lactones, for example ε-caprolactone, or of hydroxy carboxylic acids, for example ω-hydroxycaproic acid, may also be used. To obtain liquid polyester polyols, it is preferred to use mixtures of at least 2 polyols or at least 2 carboxylic acids.

Examples of suitable polyacetals are the compounds which can be produced from glycols, such as di-, tri-, or tetra-ethylene glycol, 4,4'-dioxethoxy diphenyl dimethyl methane, hexane diol and formaldehyde or trioxane.

Suitable polycarbonates containing hydroxyl groups are those of the type wich can be obtained for example by reacting diols, such as 1,3-propane diol, 1,4-butane diol or 1,6-hexane diol, di-, tri- or tetra-ethylene glycol, with diaryl carbonates or phosgene.

Before they are used in the polyisocyanate-polyaddition process, the polyhydroxyl compounds mentioned may be modified in various ways, for example by further esterification or etherification of preformed segments, by reaction with less than the equivalent quantity of a diisocyanato-carbodiimide, and by subsequent reaction of the carbodiimide group with an amine, amide, phosphite or carboxylic acid. It is even possible in some cases to use polyhydroxyl compounds containing high molecular weight polyadducts and polycondensates or polymers in finely dispersed or dissolved form. Polyhydroxyl compounds such as these are obtained for example by carrying out polyaddition reactions (such as reactions between polyisocyanates and amino functional compounds) or polycondensation reactions (such as between formaldehyde and phenols and/or amines) in situ in the compounds containing hydroxyl groups mentioned above. Polyhydroxyl compounds modified by vinyl polymers, of the type obtained, for example, by polymerizing styrene and acrylonitrile in the presence of polyethers or polycarbonate polyols, are also suitable for use in the process according to the invention. Where modified polyhydroxyl compounds of the type mentioned above are used as starting components in the polyisocyanate-polyaddition process, polyurethane foams having significantly improved mechanical properties are formed in many cases. It is of course possible to use mixtures of the hydroxyl compounds mentioned above containing at least two isocyanate-reactive hydrogen atoms and having an average molecular weight of from 400 to 10,000 (for example, mixtures of polyethers and polyesters) optionally with additional incorporation of low molecular weight polyols. A more detailed list of suitable polyhydroxyl compounds is given on pages 11 to 21 of German Offenlegungsschrift No. 2,854,384.

Suitable polyisocyanates are aliphatic, cycloaliphatic, araliphatic, aromatic and heterocyclic polyisocyanates of the type normally used in the production of polyurethane plastics. Examples include 1,6-hexamethylene diisocyanate; 1,12-dodecane diisocyanate; caproic acid methyl ester-2,6-diisocyanate; 1-isocyanato-3,3,5-trimethyl-5-isocyanatomethyl cyclohexane; 2,4- and 2,6-hexahydrotolylene diisocyanate; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and/or 2,6-tolylene diisocyanate; diphenylmethane-2,4'- and/or -4,4'-diisocyanate and its alkyl derivatives and naphthylene-1, 5-diisocyanate. It is also possible to use polyphenyl-polymethylene polyisocyanates of the type obtained by condensing aniline with formaldehyde, followed by phosgenation, as described for example in British Pat. Nos. 874,430 and 848,671; polyisocyanates containing carbodiimide groups; polyisocyanates containing allophonate groups or, isocyanurate groups, urethane groups or biuret groups; and polyisocyanates produced by telomerization reactions. Other suitable polyisocyanates are described in detail on pages 8 to 11 of German Offenlegungsschrift No. 2,854,384. It is also possible to use mixtures of the above-mentioned polyisocyanates.

In general, it is particularly preferred to use the commercially available polyisocyanates, for example, 2,4- and/or 2,6-tolylene diisocyanate (TDI); polyphenyl-polymethylene polyisocyanates, of the type obtained by condensing aniline with formaldehyde, followed by phosgenation (crude MDI); and polyisocyanates containing carbodiimide groups, urethane groups, allophonate groups, isocyanurate groups, urea groups or biuret groups, (modified polyisocyanates) and particularly modified polyisocyanates of the type derived from 2,4- and/or 2,6-tolylene diisocyanate or from 4,4'- and/or 2,4'-diphenylmethane diisocyanate.

Other compounds containing at least two isocyanate-reactive hydrogen atoms and having a molecular weight of from 62 to 400 (preferably 62 to 300) may also be used as reactive components for polyol mixtures. These compounds include, in particular, compounds containing hydroxyl groups, but also compounds containing amino groups and/or thio groups and/or carboxyl groups and/or terminal hydrazide groups, which are known as chain extending agents or crosslinking agents. These compounds generally contain from 2 to 8 and preferably from 2 to 4 isocyanate-reactive hydrogen atoms, particularly hydroxyl groups. In this case, too, it is possible to use mixtures of these compounds. Examples of compounds of this type include ethylene glycol, propylene glycol, trimethylene glycol, tetramethylene glycol, 2,3-butylene glycol, pentamethylene glycol, hexamethylene glycol, neopentyl glycol, 1,4-bis-hydroxy methyl cyclohexane, 2-methyl-1-3-propane diol, dibromobutene diol, trimethylol propane, pentaerythritol, quinitol, sorbitol, castor oil, diethylene glycol, relatively low molecular weight polyethylene glycols having a molecular weight of up to 400, dipropylene glycol or higher polypropylene glycols having a molecular weight of up to 400, dibutylene glycol and its higher oligomers having a molecular weight of up to 400, 4,4'-dihydroxy diphenyl propane, dihydroxy ethyl hydroquinone, ethanolamine, diethanolamine, n-methyl diethanolamine, n-tert.-butyl di-($\beta$-hydroxypropylamine), triethanolamine and 3-aminopropanol. Other suitable low molecular weight polyols include mixtures of hydroxy aldehydes and hydroxy ketones (formose) and the polyhydric alcohols (formitol) obtained therefrom by reduction. Other compounds are mentioned as further examples of compounds of this type on pages 20 to 26 of German Offenlegungsschrift No. 2,854,384.

In addition, compounds which are monofunctional with respect to isocyanates may optionally be used as so-called chain terminators in quantities of from 0.01 to 10% by weight, based on polyurethane solids. Examples of compounds such as these are monoamines, such as butyl or dibutyl amine, stearyl amine, N-methyl stearyl amine, piperidine, cyclohexyl amine, or monoalcohols, such as butanol, 2-ethyl hexanol, ethylene glycol monomethyl ether.

Known catalysts may also be used. Examples of possible catalysts include tertiary amines, such as triethyl amine, n-methyl morpholine, tetramethyl ethylene diamine, 1,4-diazabicyclo-(2,2,2)-octane, bis-(dimethylaminoalkyl)-piperazines, dimethyl benzylamine, 1,2-dimethyl imidazole, monocyclic and bicyclic amidines, bis-(dialkylaminoalkyl ethers), tertiary amines containing amide (preferably formamide); and known Mannich bases of secondary amines and aldehydes or ketones. According to the invention, organometallic compounds, such as organo tin compounds, are preferably used as catalysts. In addition to sulfur-containing compounds, such as di-n-octyl tin mercaptide, preferred organo tin compounds include tin (II) salts of carboxylic acids, such as tin (II) acetate, tin (II) ethyl hexoate, and tin (IV) compounds, for example, dibutyl tin dichloride, dibutyl tin diacetate, dibutyl tin dilaurate or dibutyl tin maleate. All the catalysts may of course, also be used in the form of mixtures. Further representatives of suitable catalysts and information on the way in which they work can be found in Kunststoff-Handbuch, Vol. VII, published by Vieweg and Hochtlen, Carl-Hanser Verlag, Munich, 1966, for example on pages 96 to 102 and in German Offenlegungsschrift No. 2,854,384.

Additional blowing agents, emulsifiers, foam initiators, foam stabilizers and other auxiliaries and additives may also be used.

Inorganic or organic blowing agents, particularly compounds such as methylene chloride, chloroform, vinylidene chloride, monofluorotrichloromethane, chlorodichlorodifluoromethane, air, $CO_2$ or nitric oxide may be employed. Further examples of blowing agents and information on their use can be found in Kunststoff-Handbuch, published by Vieweg and Hochtlen, Carl-Hanser Verlag, Munich 1966, for example on pages 108 and 109, 453 to 455 and 507 to 510.

Surface-active additives, such as emulsifiers and foam initiators, are used in the usual way. Suitable emulsifiers include for example, sodium salts of caster oil sulfonates or salts of fatty acids with amines, such as diethyl amine oleate, alkali or ammonium salts of sulfonic acids, such as dodecyl benzone sulfonic acid or dinaphthyl methane disulfonic acid.

Suitable foam stabilizers are, preferably, polyether siloxanes, particularly water-soluble types.

Reaction retarders, for example acid-reacting substances, such as hydrochloric acid, chloroacetic acid or organic acid halides may be used.

Finally, known cell regulators, such as paraffins or fatty alcohols or dimethyl polysiloxanes; known pigments or dyes and/or flameproofing agents; stabilizers against the effects of ageing and weather; plasticizers; fungistatic and/or bacteriostatic substances; and fillers may also be used.

Particulars of these auxiliaries and additives are given on pages 26 to 31 of German Offenlegungsschrift No. 2,854,384 and in the literature references cited therein.

The foams may be produced in the usual way both as a free rise foam and as a molded foam. The foams may also be produced for block foaming or by known laminator processes or by any other variant of foam-manufacturing techniques.

The invention is further illustrated by methods for the production of possible mixed anhydrides and examples of processes using these anhydrides, but it is not intended to be limited by the following examples in which all parts and percentages are by weight unless otherwise specified.

PRODUCTION OF MIXED ANHYDRIDES

METHOD 1

386.4 g (2.3 moles) of hexamethylene diisocyanate are added dropwise at around 10° C. to 510 g (5 moles) of pivalic acid in 1800 ml of cleaning spirit. After stirring for about 2 hours at room temperature, the deposit is filtered off under suction, washed with petroleum ether and air-dried. Yield: 825 g=96.4%; Mp: 82° to 85° C.; $CO_2$-evolution: 85° to 150° C.

METHOD 2

168 g (1.0 mole) of hexamethylene diisocyanate are added dropwise at room temperature to a solution of 175 g (1.2 moles) of adipic acid in 2000 ml of dioxane. The mixture is then stirred at room temperature until all the NCO-groups have reacted. The deposit formed is then filtered off under suction, washed with petroleum ether and air-dried at room temperature. Yield: 243 g=77.4%; Mp: 110° C.; $CO_2$-evolution: 110° to 160° C.

METHOD 3 (GENERAL METHOD)

1 val of an organic isocyanate is added dropwise at room temperature to a solution of 1.33 vals of a carboxylic acid in 300 to 800 ml of an inert organic solvent. The mixture is then stirred for several hours at room temperature until all the NCO-groups have reacted. The deposit formed is filtered off under suction, washed with petroleum ether and air-dried. The following compounds were produced.

| Compound | Isocyanate component | Carboxylic acid component | Reaction solvent* | ml | Yield+++ % |
|---|---|---|---|---|---|
| A | isocyanatocyclohexane | adipic acid | D | (700) | 16 |
| B | isocyanatohexadecane | adipic acid | D | (700) | 62 |
| C | isocyanatohexadecane | benzoic acid | D/E++ | (800) | 11 |
| D | 1,4-diisocyanatobutane | benzoic acid | E | (450) | 45 |
| E | 1,4-diisocyanatobutane | pivalic acid | W | (300) | 45 |
| F | 1,6-diisocyanatohexane | dodecanoic acid | W | (800) | 96 |
| G | 1,6-diisocyanatohexane | coconut oil fatty acid mixture | P | (800) | 92 |

*W = cleaning spirit(hydrocarbon-petroleum fraction, boiling range 100-140° C.)
P = petroleum ether
D = dioxane
E = diethyl ether
++D/E = 1:7
+++Yield refers to the lowest molar fraction of starting compounds.

METHOD 4

84 g (0.5 mole) of 1,6-diisocyanatohexane are added dropwise at room temperature to a solution of 45 g (0.5 mole) of anhydrous oxalic acid ($PK_1$=1.23, $PK_2$=4.19) in 350 ml of diethyl ether. After one third of the diisocyanate has been added, the reaction had to be terminated because of excessive evolution of gas (unsuitable carboxylic acid).

USE OF THE MIXED ANHYDRIDES

EXAMPLE 1

10 parts by weight of the compound produced by Method 1 are dissolved at around 40° C. in a mixture of 100 parts, by weight, of a polyol mixture having an hydroxyl number of 500, a water content of less than 0.3, by weight, and a viscosity at 25° C. of 2500 mPas, consisting of 60 parts, by weight, of a polyether with an OH-number of 860 obtained by the addition of propylene oxide with trimethylol propane; and 40 parts by weight of a polyether with an OH-number of 42 obtained by the addition of a mixture (70:30 mols %) of propylene oxide and ethylene oxide with a mixture of trimethylol propane and propylene glycol (molar ratio=3:1);

1.0 part, by weight, of a standard commercial polysiloxane-polyalkylene oxide block copolymer as foam stabilizers (Bayer-AG-West Germany-Baysilon OS-50); 3.0 parts by weight of N-dimethyl benzyl amine and 0.5 parts by weight of tetramethylguanidine as catalysts; 3.0 parts by weight of amidamine-oleic acid salt, produced from 1 mole of 3-dimethylamino-1-propyl amine and 2 moles of oleic acid, as internal release agent; 0.2 parts by weight of 85% aqueous orthophosphoric acid as reaction retarder. After cooling to room temperature, this mixture is reacted with 133 parts of a polyisocyanate which had been obtained by phosgenating aniline-formaldehyde condensates and which has a viscosity of 130 mPas at 25° C. and an NCO-content of 31% by weight.

The polyurethane integral foam test sheet was produced on a type HK 100 machine and the reaction time was determined during processing in this machine.

| Reaction times: | cream time: | 14 seconds |
|---|---|---|
| | gel time: | 29 seconds |
| | mold dimension: | 92 × 42 × 1 cm. |

The test sheet has a smooth, fault-free surface. The free rise foam has a gross density of 130 kg/m³. Mechanical test data (density 601 g/cc): (DIN 53432):

| Flexural test: | ob B 40.6 MPa |
|---|---|
| | ob max 40.6 MPa |
| | deflection 14.3 mm |
| | deflection at o max 14 mm |
| | peripheral fiber elongation 9.1% |
| | E-modulus 951 MPa |
| | $WB_{10}$ 82° C. |

| Tensile test: | 18.6 MPa |
| --- | --- |
| | ε 11% |
| | E-modulus 549 MPa |

EXAMPLE 2

100 parts by weight of the polyol from Example 1 are intensively stirred with 10 parts by weight of the reaction product of 1 mole of adipic acid and 2 moles of isocyanato-hexadecane, followed by reaction with 133 parts by weight of the polyisocyanate from Example 1. A rigid foam having a gross density of 162 kg/m$^3$ is formed.

EXAMPLE 3

In a manner similar to Example 2, the reaction product of 2 moles of pivalic acid with 1 mole of 1,4-diisocyanatobutane is used as the blowing agent in a quantity of 10 parts. A rigid foam having a gross density of 128 kg/m$^3$ is formed.

EXAMPLE 4

To 97 parts of a thermoplastic polyurethane having a density of 1.2 g/cc, produced from 100 parts of a polyester having an OH-number of 56, an average molecular weight of 2000, and produced from ethylene glycol, butane diol and adipic acid; 10 parts of 1,4-butane diol, 40 parts of 4,4'-diphenylmethane diisocyanate and 0.3 part of stearyl amide as lubricant, is added to 3 parts of the product obtained by Method 2 by scattering the powder onto the granulate, followed by extrusion to form a round cord at a melt temperature of 200° to 210° C. The product is blown to a density of 1 g/cc by the mixed anhydride.

Where 5 parts of the blowing agent are added to 95 parts of the PU-material, a density of 0.8 g/cc is obtained in the cellular polyurethane.

EXAMPLE 5

In a manner similar to Example 2, 10 parts of each of the reaction products obtained by Method 3 are used as blowing agents. Rigid foams having the following gross densities are formed:

| Compound | Gross density (kg/m$^3$) |
| --- | --- |
| A | 143 |
| C | 297 |
| D | 235 |
| F | 282 |
| G | 250 |

What is claimed is:

1. In a process for the preparation of cellular plastic products comprising blowing said plastic with a blowing agent, the improvement wherein said blowing agent comprises a mixed anhydride which has a melting point of at least 40° C. and is obtained by the reaction of (a) mono- and/or polyisocyanates bound to aliphatic, cycloaliphatic or araliphatic radicals and (b) weak mono- and/or polycarboxylic acids with PK$_1$-values of from 4 to 7, and wherein said blowing agent is used in a quantity of from 0.05 to 20% by weight, and the blowing of said plastic is carried out at temperatures above 100° C.

2. A process according to claim 1, characterized in that the mixed anhydride corresponds to the formula

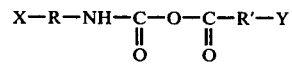

wherein
R represents a mono- or polyfunctional aliphatic, cycloaliphatic or araliphatic radical;
R' represents a mono- or polyfunctional aliphatic, cycloaliphatic, araliphatic or aromatic radical;
X represents H or

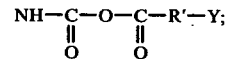

and Y represents H or

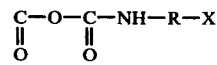

3. A process according to claim 2, characterized in that R represents a mono- to difunctional aliphatic, cycloaliphatic or araliphatic radical.

4. A process according to claim 2, characterized in that R represents a mono- or polyfunctional aliphatic, cycloaliphatic or araliphatic radical substituted by substituents that are not reactive with isocyanates.

5. A process according to claim 4, characterized in that R represents a mono- or tetrafunctional aliphatic, cycloaliphatic or araliphatic radical substituted by an alkyl, aryl or halogen.

6. A process according to claim 2, characterized in that R' represents a mono- or polyfunctional aliphatic, cycloaliphatic, araliphatic or aromatic radical containing substituents which are not reactive to NCO from the alkyl or halogen series.

7. A process according to claim 1, characterized in that the blowing agent is used in a quantity of from 1 to 12%, by weight.

8. A process according to claim 1, characterized in that the blowing agent is used in a quantity of from 3 to 10%, by weight.

9. A process according to claim 1, characterized in that said plastic is a polyurethane and the mixed anhydride is dispersed and/or dissolved in the polyol starting material for the polyurethane.

10. A process according to claim 2, characterized in that the cellular plastic product is a semi-rigid or rigid integral skin polyurethane foam and the mixed anhydride is used in admixture with other blowing agents.

11. A process according to claim 1, characterized in that the mixed anhydride is obtained by the reaction of 1 mole of 1,6-hexane diisocyanate and 2 moles of straight-chain or branched aliphatic C$_2$ to C$_{16}$-monocarboxylic acids.

12. A process according to claim 1, characterized in that the mixed anhydride is obtained by the reaction of 1 mole of 1,6-hexane diisocyanate and 1 mole of adipic acid.

13. A process according to claim 1 characterized in that said plastic is a thermoplastic polyurethane to which the mixed anhydride blowing agent has been added and the resulting mixture is further processed at temperatures above 100° C.

14. A process according to claim 13, characterized in that the mixed anhydride is admixed with other blowing agents.

15. A process according to claim 13, characterized in that the further processing takes place at temperatures above 200° C.